June 24, 1941.  W. E. EWART  2,247,153
CONTINUOUSLY VARIABLE SPEED CHANGING MEANS
Filed Feb. 26, 1940  2 Sheets-Sheet 1

INVENTOR
William E. Ewart
BY
Smith & Tuck
ATTORNEYS

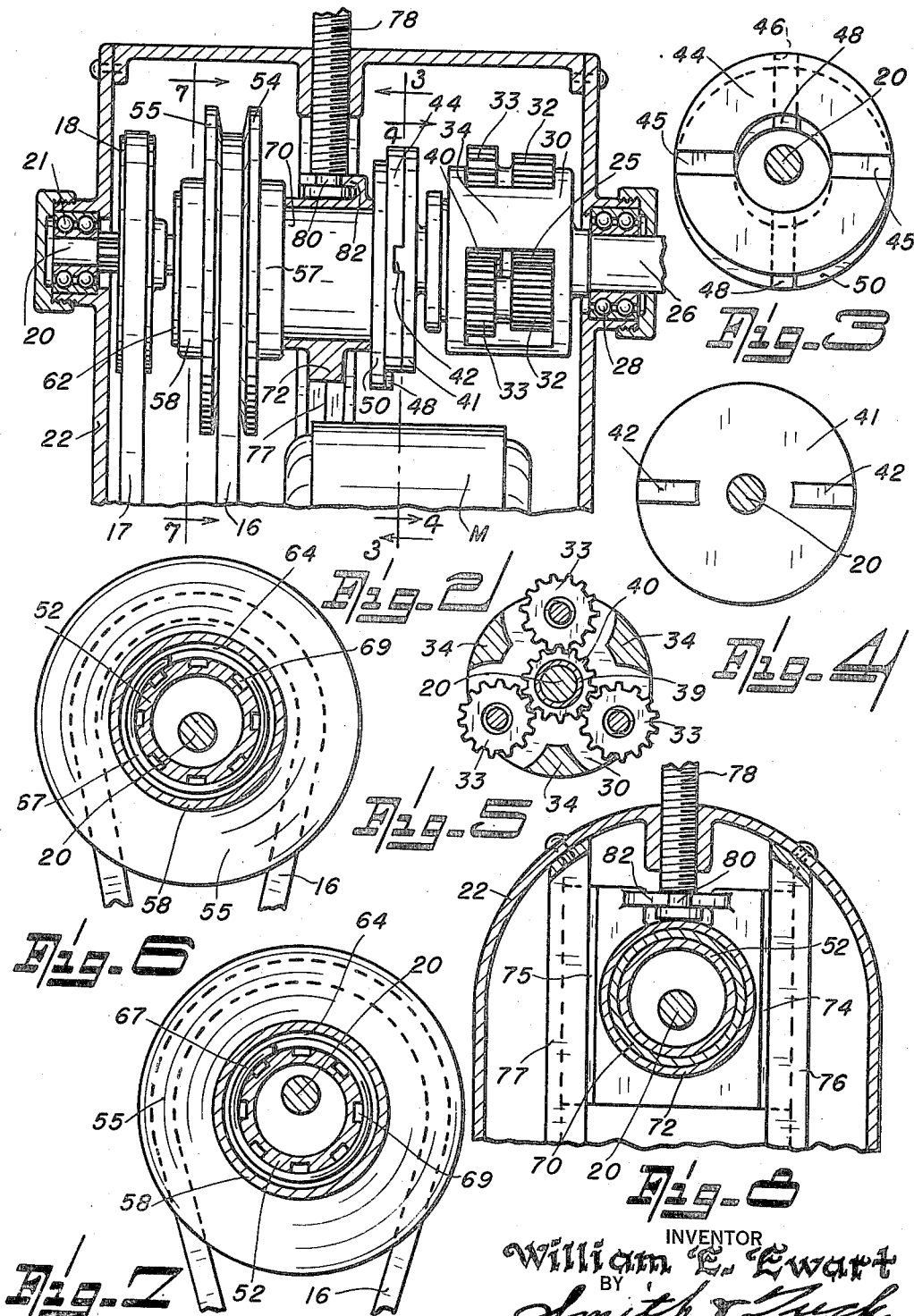

Patented June 24, 1941

2,247,153

UNITED STATES PATENT OFFICE 2,247,153

CONTINUOUSLY VARIABLE SPEED CHANGING MEANS

William E. Ewart, Seattle, Wash.

Application February 26, 1940, Serial No. 320,961

8 Claims. (Cl. 74—286)

My present invention relates to the art of speed change mechanisms and more particularly to continuously variable speed changing means.

My device consists essentially of providing a drive shaft which, through a sun gear, drives a group of planetary gears which, in turn, are individually, directly connected to adjacent planetary gears. These gears are, in turn, enmeshed with a second sun gear. The second sun gear is connected through means of a sliding or displacement coupling to a shaft which is adapted for rotation from the same source of power as the drive shaft; which drive, however, is affected by a speed-changing means so that the second sun gear shaft may be rotated at varying speeds both above and below that of the driving shaft. The difference in speed between the sun gears is employed, by a differential action, to drive the spider carrying the planet gears. This spider drives a third shaft, or power output shaft, at varying speeds above or below that of the driving shaft.

For many industrial and automotive uses it is desirable to provide a speed-changing means that may operate over a wide range of speeds and may have its ratio varied while under load. The devices normally employed for this purpose are characterized by great bulk, and it is difficult to get a positive drive due to the fact that the driving units themselves, usually of the friction variety, must be so large to assure positive operation that the whole equipment becomes too costly and bulky for general application.

In my present device, however, I have provided a means for supplying this field that may be compactly made, and which will operate over long periods with a positive drive at the full range of speeds for which it is designed.

The principal object of my present invention, therefore, is to provide a speed-changing means that will give a positive drive, yet one that is capable of a wide range of speed ratios, which speed ratios may be varied while under load.

A further object of my present invention is to provide a speed-changing means which is itself constructed so that the speed-changing unit may operate continuously and transmit its variable speed through a coupling means to a gear system which will in turn provide a power outlet shaft with a wide range of speed variations.

Another important object of my invention is to provide a V-belt drive means which, through a suitable coupling, can be operated on varying centers with respect to the driving pulley and yet give a power output that will be continuous in its driving effort.

Other and more specific objects will be apparent from the following description taken in connection with the accompanying drawings, wherein—

Figure 2 is a fragmentary view showing the upper portion of Figure 1, but with certain of the parts in outline while certain other of the parts are shown in section, with the hollow shaft in its lower position.

Figure 3 is a cross-sectional view taken along the line 3—3 of Figure 2, looking to the left as the figure is viewed.

Figure 4 is a cross-sectional view taken along the line 4—4 of Figure 2 looking to the right as viewed in the figure.

Figure 5 is a cross-sectional view taken along the line 5—5 of Figure 1.

Figure 6 is a cross-sectional view taken along the line 6—6 of Figure 1, but showing the speed-changing hollow shaft in its upper position.

Figure 7 is a view taken along the line 7—7 of Figure 2 with the hollow shaft in its lower position.

Figure 8 is a cross-sectional view taken along the line 8—8 of Figure 1.

Figure 1:
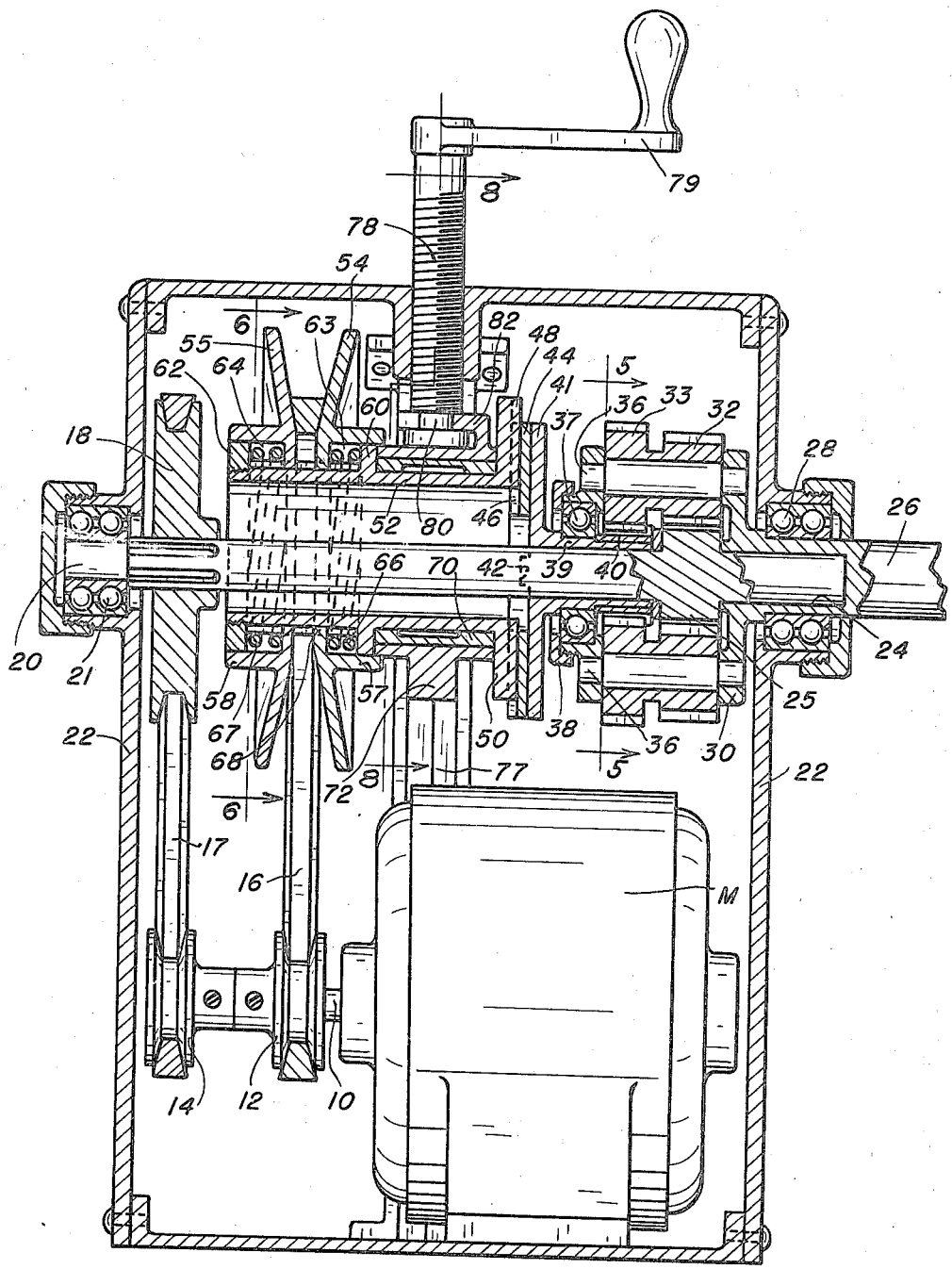
Figure 1 is a typical, vertical, sectional view taken in a plane along the power shaft of my device with the hollow shaft in its upper position.

Referring to the drawings, throughout which like reference characters indicate like parts, 10 designates a power drive shaft which may receive its energy from any source of power as the electric motor M. Fixedly secured to shaft 10 are two drive pulleys 12 and 14. These pulleys drive, respectively, the preferred V-belts 16 and 17. Belt 17 drives the grooved pulley 18 which in turn is fixedly secured to the center line or drive shaft 20. One end of shaft 20 is supported by the anti-friction bearing shown at 21, which bearing is suitably housed within a bearing portion of housing 22. Near its right hand end shaft 20 has secured to it or, preferably, made a part thereof, the sun gear, or pinion 25. The opposite end of shaft 20 is seated within a pilot bearing at 24 within the power output shaft 26. The power output shaft, in turn, is supported by the anti-friction bearing shown at 28, which bearing is suitably housed in a bearing portion of housing 22. The two bearings 21 and 28 are in axial alignment.

Formed as part of, or at least fixedly secured to, shaft 26, is a spider mount 30. This mount provides bearings for the double planetary gears 32 and 33 of which there are, preferably, three for easy balancing and a more continuous drive. Spider 30 is provided with a plurality of web members 34 which extend the length of gears 32 and 33 so as to support the end bearings as 36. The bearing portion of spider 30 which houses bearings 36 is provided with an anti-friction bearing 37; this bearing being held in place by a cover member 38. Bearing 37 is mounted upon a sleeve 39 which, at one end, has secured to it the sun pinion 40 and at its other end the flange or plate member 41. This plate 41 forms one of the members of a sliding, aligning coupling and may be deformed in any suitable manner to accommodate this mechanism as by having the radially extending lugs 42.

Lugs 42 engage a free or coupling plate 44; one surface of which is indicated in Figure 3 as being provided with radially disposed grooves or slots 45. The opposite side of plate 44 is preferably provided with grooves or slots 46, radially disposed at right angles to slots 45. These slots are adapted to engage the outwardly extending, radially disposed lugs 48 provided on the surface of flange 50. Flange 50 forms a part of a rotatable hollow shaft 52 which is provided at its opposite end, the left hand side as viewed in Figures 1 and 2, with a spring-loaded collapsible cone pulley composed of the two plate members 54 and 55. These plates are provided with beveled faces so that the angle included between the two plates shall be the same as the angle of belt 16, and thus provide an adjustable pulley that can be driven by belt 16. The driving belt is shown in its lowermost position in Figure 1, and in its upper position in the showings of Figures 2 and 7.

Each of the two plates 54 and 55 is provided with a centering and supporting flange as 57 and 58, respectively. These flanges bear, respectively, upon an annular ring 60 formed as part of the hollow shaft 52, and the preferably screwed on ring member 62 which is removable from shaft 52 for purposes of easy assembly. This arrangement provides the two spring pockets as 63 and 64 in which are disposed the compression springs 66 and 67. These springs tend to force plates 54 and 55 together in tight engagement with belt 16 so that a positive drive is provided whether the belt rides on a circle near the center of plates 54 and 55, or out near their outer periphery. Flanges 54 and 55 are caused to revolve with the hollow shaft 52 by being provided with a plurality of downwardly extending lugs 68 which engage a plurality of notches or grooves 69 formed in the periphery of the hollow shaft 52.

The hollow shaft 52 is provided with a bearing at 70. This bearing is adjustably positioned and supported by the carrier member 72. This member, the construction of which is best shown in Figures 1, 2, and 3 is provided with side extensions as 74 and 75 adapted to engage guideways 76 and 77, respectively. The carrier is adjustably positioned by the screw member 78. This member is provided with an operating handle as 79 and at its lower end with a reduced neck portion 80. This arrangement provides a two-way movement for carrier 72, by having at its upper surface a fork like member 82 which engages the reduced neck portion 80 of screw 78. Thus, by adjusting screw 78, carrier 72 may be moved upwardly or downwardly and will be held in its adjusted position due to the non-reversible action of the thread on screw 78.

*Method of operation*

In operating my device, shaft 10 is turned by any suitable source of power as motor M and drive belts 16 and 17, preferably, at the same speed. By so doing shaft 20 is continuously revolved through the action of pulley 18 which is secured thereto and in so doing gear 25 is also constantly revolved in one direction. Belt 16 drives the collapsible pulley formed on members 54 and 55 in the same direction as pulley 18, and in so doing also drives the hollow shaft 52, which is free to revolve within bearing 70. As the hollow shaft 52 is revolved, so also is flange 50 and this flange, driving through the free disc 44, drives disc 41 at the same speed and in the same direction as shaft 52. Flange 41 is a portion of sleeve 39 and, as a result, the sun gear 40, which is secured thereto, is continuously driven; thus pinion 25 and pinion 40 are driven in the same direction. If pinions 25 and 40 are driven so that they revolve at the same speed, then the planet gear assembly is locked and shaft 26, carrying spider 30, will also be driven at their speed.

If, on the other hand, by adjustment of the position of shaft 52 by means of crank 79, belt 16 is caused to operate on a circle, within the collapsible pulley, greater in diameter than the diameter of pulley 18, there will be a reduction in speed, assuming pulleys 12 and 14 to be the same size. This will have the effect of causing pinion 40 to revolve slower than pinion 25, and this difference in speed will be taken care of by the differential action of the planetary gears 32 and 33 and, thus, the shaft 26 will be given a difference in speed due to the progression of the planet gears around the sun gears.

It will be apparent, it is believed, that by choosing suitable proportions either a step-up or reduction drive can thus be provided between shaft 10 and shaft 26; or if suitable proportions are assumed, an over drive and under drive could be similarly arranged and effected.

It is particularly desired to point out that, through the use of a suitable coupling arrangement as exemplified by flanges 41 and 50 and the coacting plate 44, the transfer of power from the collapsible pulley to pinion 40 can be effected throughout the full range of adjustment of bearing 70, and thus speed ratios can be varied while the equipment is carrying the full load for which it is designed.

The foregoing description and the accompanying drawings are believed to clearly disclose a preferred embodiment of my invention, but it will be understood that this disclosure is merely illustrative and that such changes in the invention may be made as are fairly within the scope and spirit of the following claims.

I claim:

1. In a variable speed transmission mechanism, the combination with a constantly revolving drive shaft and a drive gear thereon, an alined driven shaft and a dual set of planetary gears mounted thereon in mesh with the drive gear, of a driven disk loose on the drive shaft and a pinion rigid with the disk and also meshing with the planetary gears, a constantly revolving tubular shaft surrounding the drive shaft and having a drive-disk, means for shifting the tubular shaft eccentrically of the drive shaft, and a slidable intermediate coupling disk joining said drive disk and driven disk.

2. In a variable speed transmission mechanism, the combination with a drive shaft, an alined driven shaft, and power transmission mechanism consisting of a revolvable differential between said shafts including a driven disk, of a constantly revolving tubular shaft surrounding the drive shaft and having a drive-disk, means for shifting the tubular shaft eccentrically of the drive shaft, and a slidable intermediate coupling disk joining said drive disk and driven disk.

3. In a variable speed transmission mechanism, the combination with a drive shaft, an alined driven shaft, and power transmission mechanism comprising a revolvable gear differential between said shafts including a driven disk, of a constantly revolving tubular shaft surrounding the drive shaft and having a drive-disk, an intermediate disk between said drive-disk and driven disk, oppositely arranged pairs of diametrically extending grooves and complementary tongues between the drive and driven disks and the intermediate disk, and means for shifting the tubular shaft eccentrically of the drive shaft.

4. In a variable speed transmission mechanism, the combination with a drive shaft, an alined driven shaft, and power transmission mechanism revolvable as a unit between said shafts including a driven-disk, of a constantly revolving tubular shaft surrounding the drive shaft, a slide bearing for the tubular shaft and means for shifting said bearing to adjust the tubular shaft eccentrically of the drive shaft, a drive-disk rigid with the tubular shaft, and a slidable intermediate coupling disk joining said drive disk and driven disk.

5. In a variable speed transmission mechanism, the combination with a drive shaft, an alined driven shaft, and power transmission mechanism comprising dual differential gearing between said shafts including a driven disk, of a constantly revolving tubular shaft surrounding the drive shaft, a slide bearing for the tubular shaft and means for shifting said bearing to adjust the tubular shaft eccentrically of the drive shaft, a slidable intermediate coupling disk, and oppositely arranged pairs of diametrically extending grooves and complementary slide tongues between said drive disk and driven disk and the intermediate disk.

6. The combination with a drive shaft, an alined driven shaft, and power transmission mechanism between said shafts, of a tubular shaft surrounding the drive shaft, a slide coupling between said tubular shaft and the power transmission mechanism, means for shifting the tubular shaft eccentrically of the drive shaft, a split sectional V-shaped pulley mounted on the tubular shaft and a driving belt therefor, and resilient means tending to close the pulley sections against said belt.

7. The combination with a drive shaft, an alined driven shaft and power transmission mechanism between said shafts, of a tubular shaft surrounding the drive shaft, a slide coupling between said tubular shaft and the power transmission mechanism, means for shifting the tubular shaft eccentrically of the drive shaft, a split sectional V-shaped pulley rotatable with the shaft, a driving belt on the pulley, and opposed resilient means tending to close the pulley sections against the belt.

8. The combination with a drive shaft, alined driven shaft and power transmission mechanism between said shafts, of a tubular shaft surrounding the drive shaft, a sliding coupling between said tubular shaft and the power transmission mechanism, means for shifting the tubular shaft eccentrically of the drive shaft, a split sectional V-shaped pulley having spaced inner flanges slidable on and rotatable with the tubular shaft, an exterior flange on the tubular shaft and a spring between said flange and one of the flange-sections, a threaded ring on the end of the tubular shaft and a spring between said ring and the other flange-section, and a driving belt for the pulley.

WILLIAM E. EWART.